(12) United States Patent
Zoller et al.

(10) Patent No.: US 12,010,783 B2
(45) Date of Patent: Jun. 11, 2024

(54) INDUCTION HEATING DEVICE, SLEEVE ELEMENT AND METHOD FOR A WEAR PROTECTION OF A MAGNETIC FLUX CONDUCTING ELEMENT BY THE SLEEVE ELEMENT

(71) Applicant: E. Zoller GmbH & Co. KG Einstell- und Messgeraete, Pleidelsheim (DE)

(72) Inventors: Alexander Zoller, Pleidelsheim (DE); Christian Pfau, Ingersheim (DE)

(73) Assignee: E. Zoller GmbH & Co. KG Einstell- und Messgeraete, Pleidelsheim (DE)

( * ) Notice: Subject to any disclaimer, the term of this patent is extended or adjusted under 35 U.S.C. 154(b) by 307 days.

(21) Appl. No.: 17/528,798

(22) Filed: Nov. 17, 2021

(65) Prior Publication Data

US 2022/0201812 A1    Jun. 23, 2022

(30) Foreign Application Priority Data

Dec. 23, 2020 (DE) ..................... 10 2020 134 800.2

(51) Int. Cl.
  *H05B 6/36* (2006.01)
  *B23P 11/02* (2006.01)
  *H05B 6/10* (2006.01)

(52) U.S. Cl.
  CPC ............ *H05B 6/365* (2013.01); *B23P 11/025* (2013.01); *H05B 6/101* (2013.01)

(58) Field of Classification Search
  CPC ...... B23P 11/025; B23P 11/027; H05B 6/101; H05B 6/14; H05B 6/365
  See application file for complete search history.

(56) References Cited

U.S. PATENT DOCUMENTS

2008/0277386 A1    11/2008    Haimer
2011/0284525 A1    11/2011    Haimer et al.
(Continued)

FOREIGN PATENT DOCUMENTS

DE    102008045781 A1    3/2010
DE    102019108605 A1    10/2020
(Continued)

OTHER PUBLICATIONS

Extended European Search Report issued Apr. 29, 2022 in EP Patent Application No. 21211553.9 (with machine English translation).
(Continued)

*Primary Examiner* — Dana Ross
*Assistant Examiner* — Joe E Mills, Jr.
(74) *Attorney, Agent, or Firm* — Posz Law Group, PLC

(57) ABSTRACT

An induction heating device for a shrink-clamping and/or unshrink-unclamping of tools into and/or out of a tool holder has an induction heating unit having at least one induction coil configured to thermally expand at least a portion of the tool holder arranged in a receiving region of the induction heating unit. The induction heating device further has at least one magnetic flux conducting unit for a conduction of a magnetic flux generated by the induction coil, the magnetic flux conducting unit having at least one magnetic flux conducting element. The induction heating device further has a sleeve element, arranged on the magnetic flux conducting element and covering the magnetic flux conducting element on at least one side of the magnetic flux conducting element that faces toward the receiving region in at least one operating state of the magnetic flux conducting unit.

20 Claims, 5 Drawing Sheets

(56) References Cited

U.S. PATENT DOCUMENTS

Figure 1:
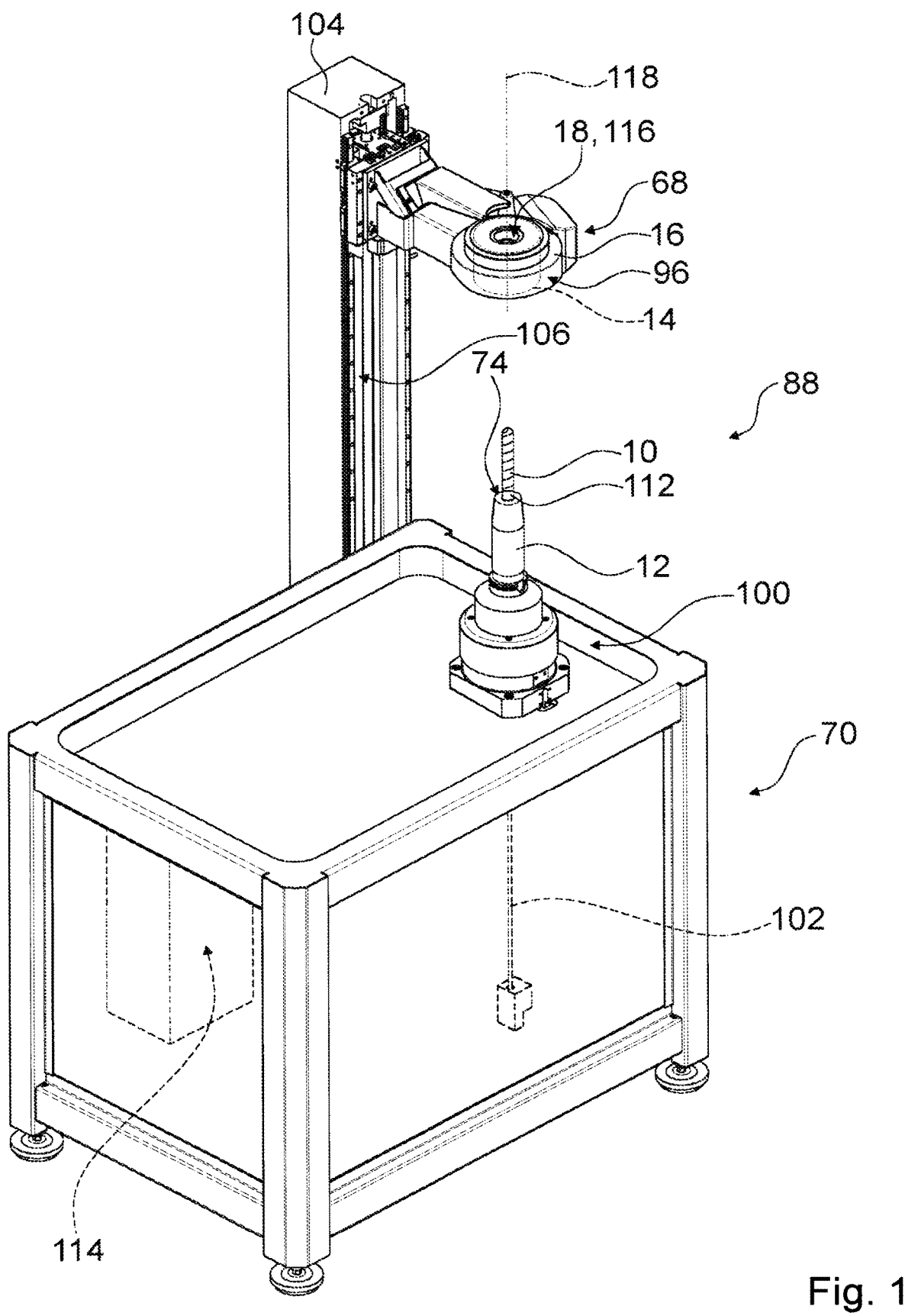

| | | | |
|---|---|---|---|
| 2015/0041456 A1* | 2/2015 | Haimer | H05B 6/365 |
| | | | 219/643 |
| 2020/0323045 A1 | 10/2020 | Zoller et al. | |
| 2020/0391335 A1 | 12/2020 | Zoller et al. | |
| 2021/0195703 A1 | 6/2021 | Zoller et al. | |

FOREIGN PATENT DOCUMENTS

| | | |
|---|---|---|
| DE | 102019115607 A1 | 12/2020 |
| DE | 102020129700 A1 | 6/2021 |

OTHER PUBLICATIONS

Office Action dated Dec. 23, 2020, issued in corresponding DE Patent Application No. 102020134800.2 (and English Machine Translation).

* cited by examiner

INDUCTION HEATING DEVICE, SLEEVE ELEMENT AND METHOD FOR A WEAR PROTECTION OF A MAGNETIC FLUX CONDUCTING ELEMENT BY THE SLEEVE ELEMENT

CROSS REFERENCE TO RELATED APPLICATION

This application is based on and incorporates herein by reference German Patent Application No. DE 10 2020 134 800.2 filed on Dec. 23, 2020.

STATE OF THE ART

The invention concerns an induction heating device according to the preamble of claim 1, a sleeve element according to claim 17 and a method according to claim 18.

In the German patent application with the application number 10 2020 129 700 an induction heating device for a shrink-clamping and/or unshrink-unclamping of tools into and/or out of a tool holder has already been proposed, with an induction heating unit which comprises at least one induction coil and is configured, during a shrink-clamping and/or unshrink-unclamping process, to thermally expand at least a portion of a tool holder arranged in a receiving region of the induction heating unit, and with at least one magnetic flux conducting unit for a conduction of a magnetic flux generated by the induction coil, comprising at least one magnetic flux conducting element implemented at least to a large extent of a ferrite material. In comparable induction heating devices of this kind the magnetic flux conducting elements may adjoin/lie upon tools and/or tool holders, some of them only with narrow edge regions or with flush ends. If the induction heating units then, for example, have a manually operable mode, a force with which the magnetic flux conducting elements abut at/impact on the tool/tool holder depends on an operator and may hence be quite a great force.

The objective of the invention is in particular to provide a generic device having advantageous characteristics in regard to its lifetime. The objective is achieved according to the invention by the features of patent claims 1, 17 and 18 while advantageous implementations and further developments of the invention may be gathered from the subclaims.

Advantages of the Invention

The invention is based on an induction heating device for a shrink-clamping and/or unshrink-unclamping of tools into and/or out of a tool holder, with an induction heating unit which comprises at least one induction coil and is configured, during a shrink-clamping and/or unshrink-unclamping process, to thermally expand at least a portion of a tool holder that is arranged in a receiving region of the induction heating unit, and with at least one magnetic flux conducting unit for a conduction of a magnetic flux generated by the induction coil, comprising at least one magnetic flux conducting element, in particular a plurality of magnetic flux conducting elements, which is/are preferably supported movably relative to the receiving region and is/are implemented at least to a large extent of a ferrite material, wherein in particular a size and/or a shape of an opening of the receiving region and/or of an opening of the magnetic flux conducting unit is variable by means of the at least one magnetic flux conducting unit.

It is proposed that the induction heating device comprises a sleeve element, which is arranged on the magnetic flux conducting element and which covers the magnetic flux conducting element on at least one side of the magnetic flux conducting element that faces toward the receiving region at least in an operating state of the magnetic flux conducting unit. This advantageously allows reducing wear of the magnetic flux conducting elements, in particular as ferrites are usually rather brittle materials. It is advantageously possible to prevent a damaging of the magnetic flux conducting elements, for example when banging on a tool that is partially received in the induction heating unit or on a tool holder that is partially received in the induction heating unit. Advantageously improved, preferably low-wear gliding of the magnetic flux conducting elements on each other is achievable, for example in an adjustment of the relative positions of the magnetic flux conducting elements relative to one another. In this way a long lifetime of the magnetic flux conducting unit is advantageously obtainable, in particular with high-grade demands on the magnetic flux conducting unit, for example caused by continuous operation of the induction heating unit. Due to prevention of damages or wear of the magnetic flux conducting elements, constant magnetic flux conducting characteristics of the magnetic flux conducting unit are advantageously achievable. It is advantageously possible to keep failure rates and/or maintenance costs at a low level. Suitability of the induction heating unit for at least largely automated shrink-clamping and/or unshrink-unclamping stations described, for example, in the German patent application with the publication number DE 10 2019 115 607 A1 is advantageously achievable. By a "magnetic flux" are/is in particular a magnet flux, a magnetic field and/or a magnetic flux density to be understood.

By a "tool holder" is in particular a component to be understood which is configured for an accommodation of a tool and for a connection of the tool with a machine. In particular, the tool holder is embodied as a tool-machine interface. Preferably the tool holder is implemented as a tool chuck, in particular a shrink chuck. The tool is in particular embodied as a shaft tool, preferably as a rotary shaft tool, for example as a drill, as a milling tool, as a profiling tool and/or as a reamer. A "shrink-clamping of tools into and/or out of tool holders" is in particular to mean a clamping of tools in tool holders wherein first of all a tool receiving opening of the tool holder is thermally expanded, then a tool is introduced in the tool receiving opening, and wherein eventually, after cooling of the tool holder, the tool is fastened in the tool holder by a force-fit connection, in particular by a friction-fit connection. An "unshrink-unclamping of tools into and/or out of tool holders" is in particular to mean a releasing of tools which are fastened in tool holders by a force-fit connection, in particular a friction-fit connection, wherein the tool receiving opening of the tool holder is thermally expanded in particular while avoiding simultaneous heating of the tool by means of a shielding unit until the tool that is fastened in the tool holder can be removed out of the tool holder.

"At least a portion of the tool holder" is in particular to mean at least a region of the tool holder which comprises the tool receiving opening of the tool holder. The magnetic flux conducting unit is in particular configured to conduct the induction magnetic field of the induction coil, preferably to direct the induction magnetic field of the induction coil away from the tool that is to be shrink-clamped and/or unshrink-unclamped, preferentially to shield the induction magnetic field against the tool that is to be shrink-clamped and/or unshrink-unclamped. In particular, the magnetic flux conducting unit forms a designated path for the magnetic flux of the induction magnetic field, in particular for the induction magnetic field. In particular, the magnetic flux conducting unit is configured to at least substantially prevent a heating of the tool in the shrink-clamping process and/or in the unshrink-unclamping process. In particular an, in particular medium, magnetic field strength of the induction magnetic field of the induction coil on a side of the magnetic flux conducting unit that is situated opposite the induction coil is reduced by at least 80%, preferably by at least 90% and preferentially by at least 99% in comparison to an arrangement without a magnetic flux conducting unit.

The magnetic flux conducting unit in particular comprises a plurality of magnetic flux conducting elements, preferably at least two magnetic flux conducting elements, advantageously at least four magnetic flux conducting elements, preferentially at least six magnetic flux conducting elements and particularly preferentially at least eight magnetic flux conducting elements. In particular, the magnetic flux conducting elements of the magnetic flux conducting unit are implemented at least substantially identically to one another. "At least substantially identically" is in particular to mean identically except for production tolerances. However, alternatively at least one magnetic flux conducting element or several magnetic flux conducting elements may be implemented differently from at least one further magnetic flux conducting element. The magnetic flux conducting element is in particular implemented at least partially of a material that is magnetically conductive and electrically nonconductive or has poor electrical conductivity. In particular, at least a portion of the magnetic flux conducting element has a high magnetic permeability. Preferably a relative magnetic permeability of the magnetic flux conducting element, in particular of the magnetically conductive portion of the magnetic flux conducting element, is at least 100, advantageously at least 500, preferentially at least 1000 and particularly preferentially at least 2000. In particular, the magnetic flux conducting element is implemented at least partially of a ferrimagnetic material. In particular, the magnetic flux conducting element is implemented at least partially of a ferrimagnetic oxide ceramic. In particular, the magnetic flux conducting element is implemented at least partially of a soft-magnetic ferrimagnetic oxide ceramic. For example, the magnetic flux conducting element comprises a NiZn ferrite or a MnZn ferrite. It is in particular conceivable that a portion of the magnetic flux conducting element that faces toward the receiving region is implemented of the ferrimagnetic oxide ceramic and a portion of the magnetic flux conducting element that faces away from the receiving region is implemented of a material different than the ferrimagnetic oxide ceramic, for example plastic. In this way a favorable magnetic field conduction is advantageously achievable, costs being at the same time as low as possible.

In particular, the magnetic flux conducting element is embodied in one piece. Preferably the magnetic flux conducting element is embodied in a one-part implementation or monolithically. "In one piece" is in particular to mean connected by substance-to-substance bond, like for example by a welding process and/or a gluing process etc., and especially advantageously molded on, for example by a production from a cast and/or by a production in a one-component or multi-component injection-molding procedure. "In a one-part implementation" is in particular to mean formed in one piece. This piece is preferably produced from a single blank, a mass and/or a cast, particularly preferentially in an injection-molding procedure, in particular in a one-component and/or multi-component injection-molding procedure. In particular, the magnetic flux conducting elements are configured for a field forming of the induction magnetic field of the induction coil. Preferably the magnetic flux conducting elements realize field former elements. Preferably the magnetic flux conducting unit realizes a field forming unit for a formation of the induction magnetic field.

In particular, for a production of the magnetic flux conducting elements first of all blanks of the magnetic flux conducting elements are pressed from a powder, preferably sintered at temperatures above 1000° C. Then the blanks are turned, preferably as a contiguous disk comprising several magnetic flux conducting elements, preferably all magnetic flux conducting elements of the magnetic flux conducting unit. Herein in particular a bulge is created on the underside of the magnetic flux conducting elements. After this the disk that has been created is divided in particular via eroding or via another separating procedure into segments, which then form the individual magnetic flux conducting elements. Alternatively, the magnetic flux conducting elements are milled from a ferrite full material.

A "receiving region of the induction heating unit" is in particular to mean an at least substantially straight opening within the induction heating unit. Preferably at least a large portion of the magnetic flux, preferably the entire magnetic flux, runs through an opening plane, in particular any opening plane, of the receiving region. Preferentially, at least substantially all magnetic field lines of the induction magnetic field extend once through the receiving region of the induction heating unit. In particular, the receiving region of the induction heating unit is aligned at least substantially parallel to a coil axis of the induction coil of the induction heating unit. In particular, the receiving region is arranged at least substantially parallel to a longitudinal axis and/or to a main extension direction of the tool holders and/or tools which can be introduced in the induction heating unit. By a "main extension direction" of an object is herein in particular a direction to be understood which runs parallel to a longest edge of a smallest imaginary rectangular cuboid just still completely enclosing the object.

In particular, the induction coil is embodied as a cylinder coil and/or as a solenoid. The induction heating unit is in particular configured to generate an induction magnetic field, preferably an, in particular high-frequency, alternating magnetic field. In particular, the material of the preferably metallic tool holder interacts with the induction magnetic field and is thus heated. "Substantially parallel" is here in particular to mean an orientation of a direction relative to a reference direction, in particular in a plane, wherein the direction has a deviation from the reference direction that is in particular smaller than 8°, advantageously smaller than 5° and especially advantageously smaller than 2°. In particular, the induction heating device comprises a bearing unit for a movable support of the magnetic flux conducting elements, preferably for a relative movable support of the magnetic flux conducting elements with respect to one another. The bearing unit is in particular configured to support the magnetic flux conducting elements relative to one another in such a way that the opening in a center of the magnetic flux conducting unit is varied by the movement of the magnetic flux conducting elements relative to one another. In particular, the magnetic flux conducting elements are movable relative to one another in an iris-like fashion. In particular, the opening is closable in an iris-like manner and/or is openable in an iris-like manner. In particular, the magnetic flux conducting elements of the magnetic flux conducting unit are arranged neighboring one another in a common plane, in particular in a common movement plane. "Neighboring" is in particular to mean directly neighboring and/or directly next to one another. In particular, in any operating state of the magnetic flux conducting unit, the magnetic flux conducting elements of the magnetic flux conducting unit are arranged closely adjoining one another. This advantageously allows achieving an especially effective magnetic flux conduction. In particular, an, in particular minimal, gap between directly neighboring magnetic flux conducting elements is less than 0.5 mm, preferably less than 0.25 mm and preferentially less than 0.1 mm, in particular in all possible operating states of the magnetic flux conducting unit. Particularly preferentially, neighboring magnetic flux conducting elements contact each other in all possible operating states. In particular, the neighboring magnetic flux conducting elements contact each other in all possible operating states (exclusively) with side edges, preferably contact edges, which preferably extend at least partly perpendicularly to the movement plane of the magnetic flux conducting elements. In particular, in each operating state of the magnetic flux conducting unit, the magnetic flux conducting elements are free of overlap with one another, in particular free of an overlap with one another at least when viewed from a direction that runs parallel to an axial direction of the receiving region of the induction heating unit. A "large portion" is to mean in particular 51%, preferably 66%, preferentially 80% and particularly preferentially 95%.

The sleeve element in particular encompasses the magnetic flux conducting element at least partly and/or at least section-wise. The sleeve element is preferably put over the magnetic flux conducting element. In particular, the sleeve element is arranged on the magnetic flux conducting element in a positionally fixed and/or skidproof manner. The sleeve element in particular follows all movements of the magnetic flux conducting element instantaneously. In particular, the sleeve element may be arranged on the magnetic flux conducting element in a form-fit manner, for example connected to the magnetic flux conducting element via a latch mechanism. Alternatively or additionally, the sleeve element may be arranged on the magnetic flux conducting element, preferably connected to the magnetic flux conducting element, by a force-fit connection (e.g. by means of a fixing element like a bolt or a screw, etc.) and/or by substance-to-substance bond (for example glued, etc.).

In particular, the magnetic flux conducting element faces toward the receiving region of the induction heating unit with a side surface, in particular with a surface extending at least substantially parallel to the axial direction of the receiving region. Preferably the sleeve element covers the magnetic flux conducting element on all sides that face toward the receiving region. In particular, the sleeve element covers the magnetic flux conducting element at least on the sides that face, at least in an operating state, toward a tool in the receiving region that is to be shrink-clamped or unshrink-unclamped. In particular, the sleeve element covers at least all possible contact sides with which the sleeve element could come into contact with a tool and/or with a further magnetic flux conducting element of the magnetic flux conducting unit in a regular operation of the induction heating unit.

If the sleeve element is implemented at least to a large extent of a metallic material, preferably of a stainless steel, preferentially of a rust-resistant steel, it is advantageously possible to maintain favorable magnetic characteristics, in particular magnetic flux conducting characteristics. Moreover, high resistance against impact and friction is advantageously achievable. In particular if the sleeve element is implemented of a stainless steel, it is moreover advantageously possible to obtain a high degree of corrosion resistance, in particular also in the case of a contact with corrosively acting or corrosion-accelerating liquids. Advantageously, with metallic materials, in particular stainless steel, friction does not result in a granular abrasion which could settle in interstices, thus leading to blockage.

Furthermore it is proposed that a first subregion of the sleeve element covers at least a tip of the magnetic flux conducting element that faces toward the receiving region at least in an operating state of the magnetic flux conducting unit. In this way reliable protection of a particularly sensitive tip region of the magnetic flux conducting element from wear and/or damaging is advantageously enabled. By a "tip" of the magnetic flux conducting element is in particular a portion of the magnetic flux conducting element to be understood that tapers to a point in a shielding plane of the magnetic flux conducting unit and/or in a plane that is parallel to the movement plane of the magnetic flux conducting elements. In particular, the tapering portion of the magnetic flux conducting element in this case has an opening angle of less than 60°, preferably less than 45° and preferentially less than 30°. In particular, the first subregion of the sleeve element thus covers at least a portion of the magnetic flux conducting element which could/would if there was no sleeve element abut on the tool and/or lie upon the tool holder.

If the first subregion has a rounded edge on an inner contact side that faces toward the tip of the corresponding magnetic flux conducting element, advantageously especially wearproof and/or breakproof shaping is enabled for a secure accommodation of the magnetic flux conducting element in the sleeve element, which in particular requires not angular contact regions which taper to a point. It is furthermore advantageously possible to provide increased wear protection especially in contact zones. Preferably, at least in the sidewise circumferential direction of the magnetic flux conducting element (i.e. in the circumferential direction of the magnetic flux conducting element extending parallel to the movement plane of the magnetic flux conducting elements), all inner edges of the sleeve elements that come into contact with the magnetic flux conducting element are rounded, such that in particular all outer contact edges of the magnetic flux conducting element can be rounded as well.

It is also proposed that a second subregion of the sleeve element covers at least one side surface of the magnetic flux conducting element which, at least in an operating state of the magnetic flux conducting unit, faces toward the receiving region. This advantageously allows providing increased wear protection at the side surfaces of the magnetic flux conducting element as well, in particular at the long side edges of the magnetic flux conducting element. In particular, the second subregion of the sleeve element thus covers at least a further portion of the magnetic flux conducting element which if there was no sleeve element could/would abut on the tool and/or lie upon the tool holder.

It is further proposed that a third subregion of the sleeve element at least partially covers at least one further side surface of the magnetic flux conducting element, which in particular differs from the side surface of the magnetic flux conducting element that faces toward the receiving region at least in an operating state, preferably at least partially covers all side surfaces of the magnetic flux conducting element. This advantageously enables especially comprehensive wear protection. In particular, the third subregion of the sleeve element adjoins a further sleeve element of a neighboring magnetic flux conducting element, such that wear caused by friction of the magnetic flux conducting elements of the magnetic flux conducting unit with each other is substantially reducible, in particular via a covering by the third subregion. In a friction between magnetic flux conducting elements, a granular abrasion can be produced which may settle in the bearing unit or between slide surfaces of the induction heating unit, thus leading to a blockage of the movement of the magnetic flux conducting elements. This is advantageously preventable by the proposed sleeve element.

In addition, it is proposed that an, in particular medium, wall thickness of the first subregion of the sleeve element and/or an, in particular medium, wall thickness of the second subregion of the sleeve element are/is substantially greater than an, in particular medium, wall thickness of the third subregion of the sleeve element. This advantageously allows achieving an especially high degree of shock resistance of the magnetic flux conducting element that is provided with the sleeve, at the same time maintaining preferably favorable magnetic flux conducting characteristics. Beyond this it is moreover advantageously possible to improve a lie-upon situation of the magnetic flux conducting element lying upon an upper side of the tool holder that is arranged in the receiving region, in particular as the sleeve element, which is substantially less wear-sensitive (being less brittle and thus less prone to spalling), forms at least a large portion of a lie-upon surface. In particular, an underside of the first subregion, which extends perpendicularly to the axial direction of the receiving region, forms a lie-upon surface for lying upon the tool holder that is arranged in the receiving region.

Moreover, if the magnetic flux conducting element moreover comprises a thickened region on at least one side edge and the sleeve element covers the thickened region, preferably completely, advantageously particularly effective wear protection of the magnetic flux conducting element is advantageously enabled. The thickened region is in particular configured to optimize a transition of the magnetic field lines from the tool holder into the magnetic flux conducting unit or vice versa. "Configured" is in particular to mean specifically programmed, designed and/or equipped. By an object being configured for a certain function is in particular to be understood that the object fulfills and/or executes said certain function in at least one application state and/or operating state.

It is further proposed that the magnetic flux conducting element is on an underside at least substantially free of a covering by the sleeve element. This advantageously allows achieving a combination of a particularly favorable magnetic flux conduction with a high level of wear protection. In particular, at least in a regular operating state, the magnetic flux conducting element is at least substantially free of a covering by the sleeve element on a side that faces toward a coil interior of the induction coil. In particular, at least in a regular operating state, the magnetic flux conducting element is at least substantially free of a covering by the sleeve element on a side that faces toward the tool holder which is arranged in the receiving region. In particular, in a mounted state of the induction heating device, the underside of the magnetic flux conducting element faces toward the coil interior of the induction coil. In particular, in a mounted state of the induction heating device, the underside of the magnetic flux conducting element faces toward the receiving region of the induction heating unit, in particular toward a tool holder that is appropriately positioned in the induction heating unit. "At least substantially free" is in particular to mean free at least to a large extent.

Beyond this it is proposed that the magnetic flux conducting element is covered by the sleeve element on its upper side at least to a large extent, preferably completely. In this way a high level of wear resistance is advantageously achievable, preferably without the magnetic flux conducting characteristics of the magnetic flux conducting unit being substantially affected. In particular, the upper side of the magnetic flux conducting element (without the sleeve element) is supported on guiding surfaces of the bearing unit for guiding the movement of the magnetic flux conducting elements, preferably on a plastic ring of the bearing unit for guiding the movement of the magnetic flux conducting elements. This support may in particular result in friction effects. Advantageously the sleeve element reduces wear caused by these friction effects. In particular, in a mounted state of the induction heating device, the upper side of the magnetic flux conducting element faces away from the coil interior of the induction coil. In particular, in a mounted state of the induction heating device, the upper side of the magnetic flux conducting element faces away from the receiving region of the induction heating unit, in particular from a tool holder which is appropriately positioned in the induction heating unit.

If the sleeve element forms a receiving tub with an all-around rim for receiving the magnetic flux conducting element, especially favorable wear protection is advantageously achievable for the magnetic flux conducting element, at the same time maintaining favorable magnetic flux conducting characteristics of the magnetic flux conducting element. Moreover, simple assembly and/or arrangement of the sleeve element on the magnetic flux conducting element are/is advantageously achievable. In particular, the walls of the tub having an all-around rim have different heights on different sides.

If then a shape of an inner face of the receiving tub is adapted to an outer shape of the magnetic flux conducting element, a particularly close fit of the sleeve element, a particularly simple mounting of the sleeve element not prone to errors and a particularly high degree of compactness are advantageously achievable.

It is also proposed that the magnetic flux conducting unit comprises a plurality of magnetic flux conducting elements, which are respectively provided with separate sleeve elements. In this way a high level of wear resistance of the entire magnetic flux conducting unit is advantageously achievable.

If, at least during one operating state of the magnetic flux conducting unit, preferably during all regular operating states of the magnetic flux conducting unit, the third subregion of the sleeve element contacts and adjoins a further sleeve element which covers a further magnetic flux conducting element of the magnetic flux conducting unit, a particularly gap-free implementation of the magnetic flux conducting unit is achievable, thus advantageously enabling particularly favorable magnetic flux conducting characteristics.

It is moreover proposed that the induction heating device comprises a pin element, which is configured to connect the sleeve element and the magnetic flux conducting element to each other. In this way an advantageous and/or simple fixation of the sleeve element to the magnetic flux conducting element is achievable. The pin elements in particular penetrate the magnetic flux conducting element and the sleeve element completely. In particular, the induction heating device comprises at least one further pin element, preferably a plurality of further pin elements, which is/are also configured to penetrate the magnetic flux conducting element and the sleeve element completely. This advantageously allows preventing the magnetic flux conducting element from wobbling in the sleeve element. In particular, the pin elements are fitted in recesses of the magnetic flux conducting elements and of the sleeve elements with a press fit or with a transition fit. Alternatively, tolerance fits are also conceivable, wherein in such a case in each case a closure element must be put onto the pin elements top and bottom, for respectively securing the connection.

If the pin element connecting the sleeve element and the magnetic flux conducting element protrudes beyond the sleeve element at least on an upper side of the sleeve element and is connected, in particular pressed, with a ball bearing circulating around the pin element, and/or if the pin element connecting the sleeve element and the magnetic flux conducting element protrudes beyond the magnetic flux conducting element on an underside of the magnetic flux conducting element and is connected, in particular pressed, with a ball bearing circulating around the pin element, an advantageous guiding of the magnetic flux conducting element in the bearing unit of the magnetic flux conducting unit is achievable. In particular, the pin element may be used as a guiding element of a translational axis of the bearing unit or, in a combination with the ball bearing, as a guiding element of a (translationally movable) rotation axis of the bearing unit.

Furthermore, the sleeve element for the induction heating device and/or a method for wear protection of the magnetic flux conducting element by means of the sleeve element are/is proposed. As a result, good wear protection is advantageously achievable.

The induction heating device according to the invention, the sleeve element according to the invention and/or the method according to the invention shall herein not be limited to the application and implementation described above. In particular, for the purpose of fulfilling a functionality that is described here, the induction heating device according to the invention, the sleeve element according to the invention and/or the method according to the invention may comprise a number of individual elements, components, method steps and units that differs from a number given here.

DRAWINGS

Further advantages will become apparent from the following description of the drawings. In the drawings an exemplary embodiment of the invention is illustrated. The drawings, the description and the claims contain a plurality of features in combination. Someone skilled in the art will purposefully also consider the features individually and will find further expedient combinations.

Figure 3:
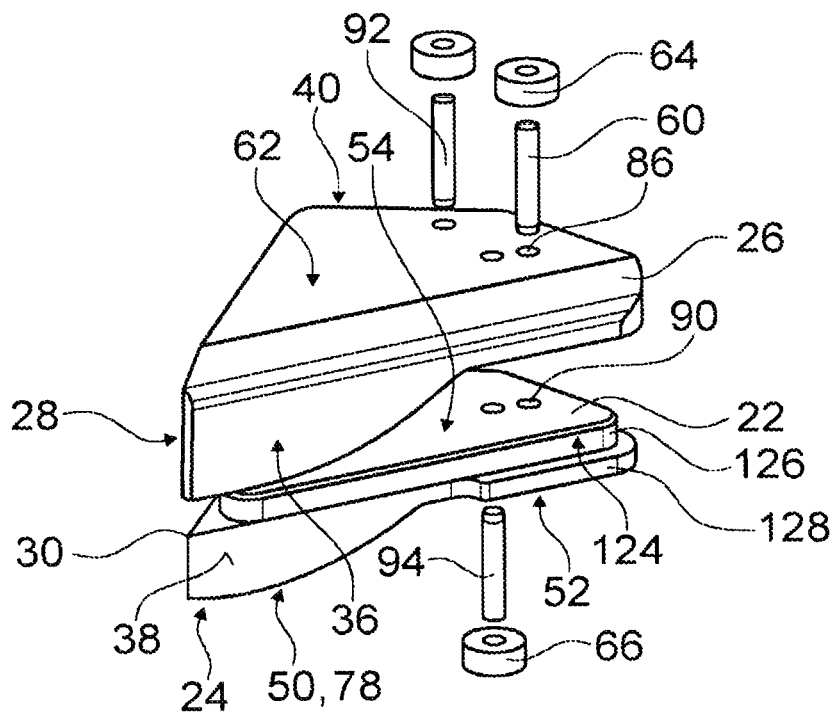
Figure 4:
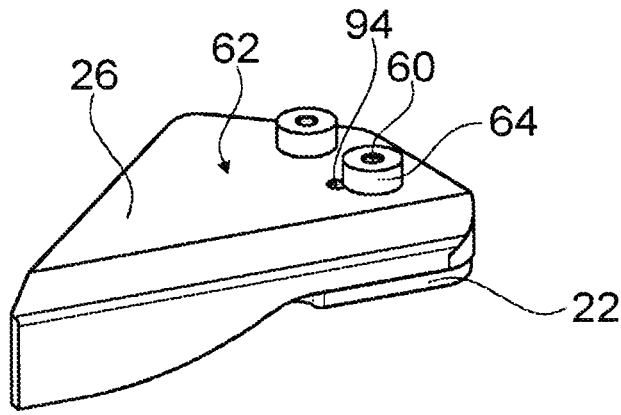
Figure 5:
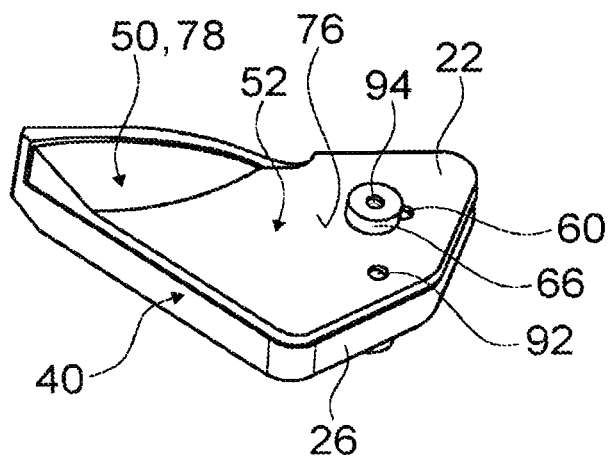
Figure 6:
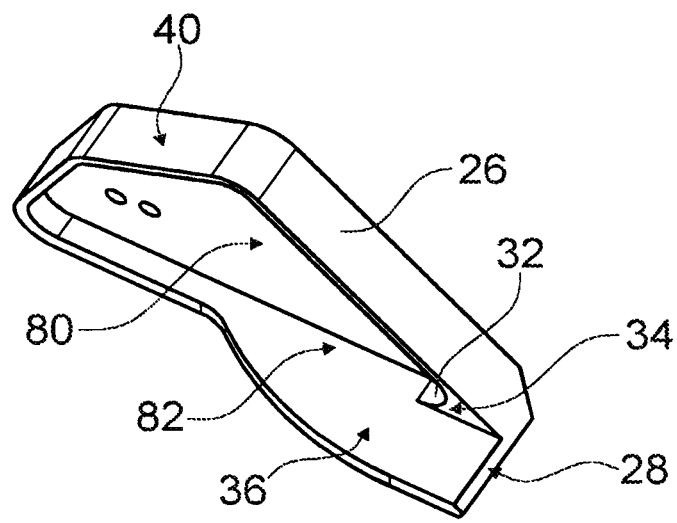
Figure 8:
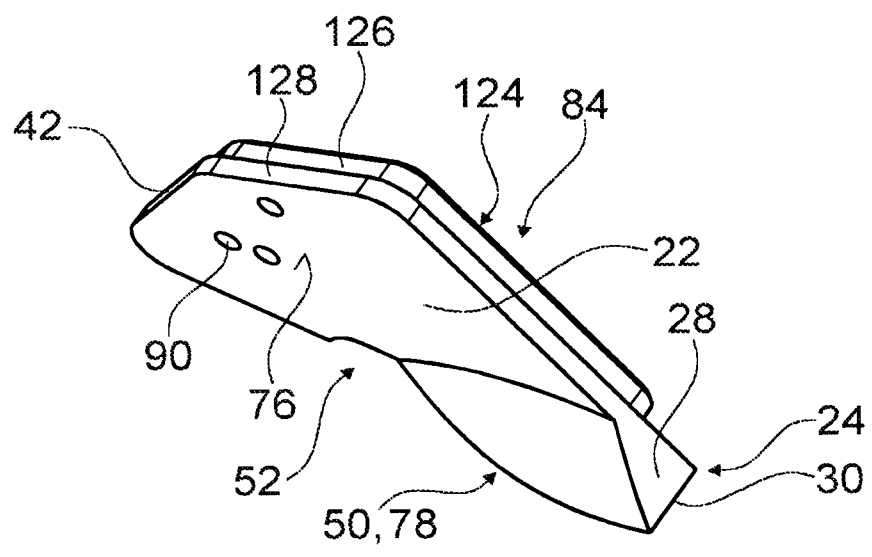
Figure 9:
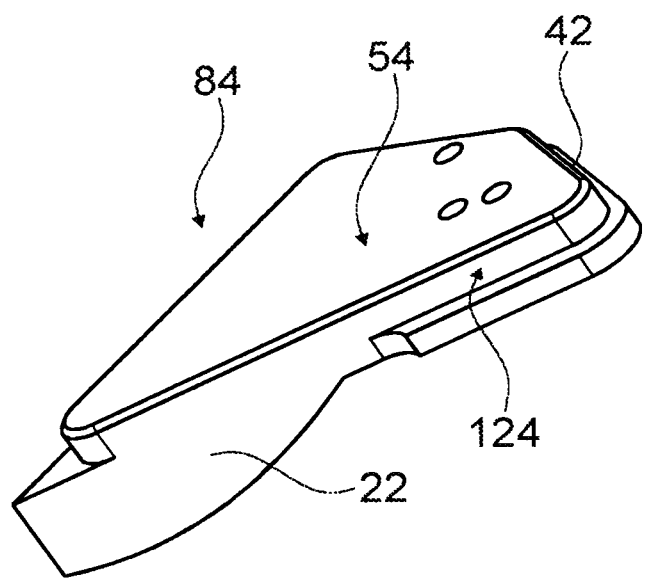

It is shown in:

FIG. 1 a schematic view of a shrink-clamping and/or unshrink-unclamping station with an induction heating device comprising a magnetic flux conducting unit, FIG. 2 a schematic view from below of the magnetic flux conducting unit that comprises a plurality of magnetic flux conducting elements, the magnetic flux conducting elements being in each case provided with sleeve elements, FIG. 3 a schematic exploded view of a magnetic flux conducting element with allocated sleeve element, FIG. 4 a schematic perspective upper view of the magnetic flux conducting element with the mounted sleeve element, FIG. 5 a schematic perspective view from below of the magnetic flux conducting element with the mounted sleeve element, FIG. 6 a schematic perspective view from below of the sleeve element without a magnetic flux conducting element, FIG. 7 a schematic plan view onto an underside of the sleeve element without a magnetic flux conducting element, FIG. 8 a schematic perspective view from below of the magnetic flux conducting element without a sleeve element, FIG. 9 a schematic perspective upper view of the magnetic flux conducting element without a sleeve element, and FIG. 10 a schematic flow chart of a method for wear protection of the magnetic flux conducting element by means of the sleeve element.

DESCRIPTION OF THE EXEMPLARY EMBODIMENT

FIG. 1 shows a shrink-clamping and/or unshrink-unclamping station 88. The shrink-clamping and/or unshrink-unclamping station 88 is configured for a shrink-clamping and for an unshrink-unclamping of tools 10 into and out of tool holders 12. The shrink-clamping and/or unshrink-unclamping station 88 is embodied as a shrink-clamping station. The shrink-clamping and/or unshrink-unclamping station 88 may be part of a presetting and/or measuring apparatus for tools 10 and/or part of a multi-clamping and measuring and/or presetting station like the one described, for example, in a German patent application with the publication number DE 10 2019 115 607 A1.

The shrink-clamping and/or unshrink-unclamping station 88 comprises a base frame 70, at, in or on which the functional units of the shrink-clamping and/or unshrink-unclamping station 88 are mounted. The shrink-clamping and/or unshrink-unclamping station 88 comprises a holding device 100 for tool holders 12. The holding device 100 comprises a length adjustment pin 102 for a presetting of an insertion depth for a tool 10 in the tool holder 12. The length adjustment pin 102 is configured to be slid into the tool holder 12 from below, thus forming an abutment for a tool 10 that is inserted into the tool holder 12 in a shrink-clamping process. Alternatively or additionally, the length adjustment pin 102 may be configured, in an unshrink-unclamping process, to exert from below a pressure onto a tool 10 in the tool holder 12, which pushes the tool 10 out of the tool holder 12 as soon as the tool holder has been sufficiently expanded thermally.

In the holding device 100 shown in FIG. 1, the tool holder 12 that is embodied as a shrink chuck is positioned. In the tool holder 12 shown in FIG. 1 by way of example, an exemplary tool 10 is fixed. The tool 10 shown is embodied as a shaft tool, in particular as a shaft drill. The tool 10 shown has a tool shaft 112. Alternatively, the tool 10 could also be embodied as a shaft tool differently than a shaft drill. The tool 10 is configured to be fastened, in particular thermally clamped in the tool holder 12. The tool holder 12 and the tool 10 clamped in the tool holder 12 implement a mounted tool unit.

The shrink-clamping and/or unshrink-unclamping station 88 comprises an induction heating device 68. The shrink-clamping and/or unshrink-unclamping station 88 comprises a tower 104. The tower 104 comprises bearing rails 106. The induction heating device 68 is linearly movable up and down along the bearing rails 106. The induction heating device 68 is movable toward the holding device 100 along the bearing rails 106. The shrink-clamping and/or unshrink-unclamping station 88 comprises a motorically driven adjustment unit 96. The motorically driven adjustment unit 96 is configured for adjusting internal components of the induction heating device 68, for example of magnetic flux conducting elements 22, 56 of a magnetic flux conducting unit 20 of the induction heating device 68. The shrink-clamping and/or unshrink-unclamping station 88 comprises a control and/or regulation unit 114. The control and/or regulation unit 114 is configured for a controlling of the motorically driven adjustment unit.

The induction heating device 68 is configured for an unshrink-unclamping of the tools 10 from the tool holders 12. Alternatively or additionally, the induction heating device 68 is configured for a shrink-clamping of the tools 10 into the tool holders 12. The induction heating device 68 comprises an induction heating unit 16. The induction heating unit 16 comprises an induction coil 14. The induction coil 14 is configured to thermally expand the tool holder 12. The induction coil 14 is configured to be put over the tool holder 12 and over the tool 10. The induction heating unit 16 forms a receiving region 18. The receiving region 18 of the induction heating unit 16 is realized as a central, in particular vertically oriented, opening 116 in the induction heating unit 16, which is preferably at least substantially cylindrical or conical. The opening 116 of the receiving region 18 extends completely through the induction heating unit 16. The receiving region 18 extends parallel to a coil axis 118 of the induction coil 14. The induction heating unit 16, in particular an induction magnetic field of the induction coil 14, is configured, in a shrink-clamping and/or unshrink-unclamping process, to thermally expand a portion of a tool holder 12 that is arranged in the receiving region 18 of the induction heating unit 16.

The induction heating device 68 comprises the magnetic flux conducting unit 20. The magnetic flux conducting unit 20 is configured for a conduction of the magnetic flux generated by the induction coil 14, in particular of the magnetic field lines of the induction magnetic field generated by the induction coil 14. The magnetic flux conducting unit 20 thus realizes a field forming unit for a formation of the induction magnetic field generated by the induction coil 14. The magnetic flux conducting unit 20 is arranged in the direction of the coil axis 118 above the induction coil 14 of the induction heating unit 16. Alternatively or additionally, the magnetic flux conducting unit 20 or a further magnetic flux conducting unit (not shown) may be arranged below the induction coil 14 of the induction heating unit 16. The magnetic flux conducting unit 20 realizes a shielding unit for shielding the induction magnetic field of the induction coil 14 from the tool 10.

Figure 2:
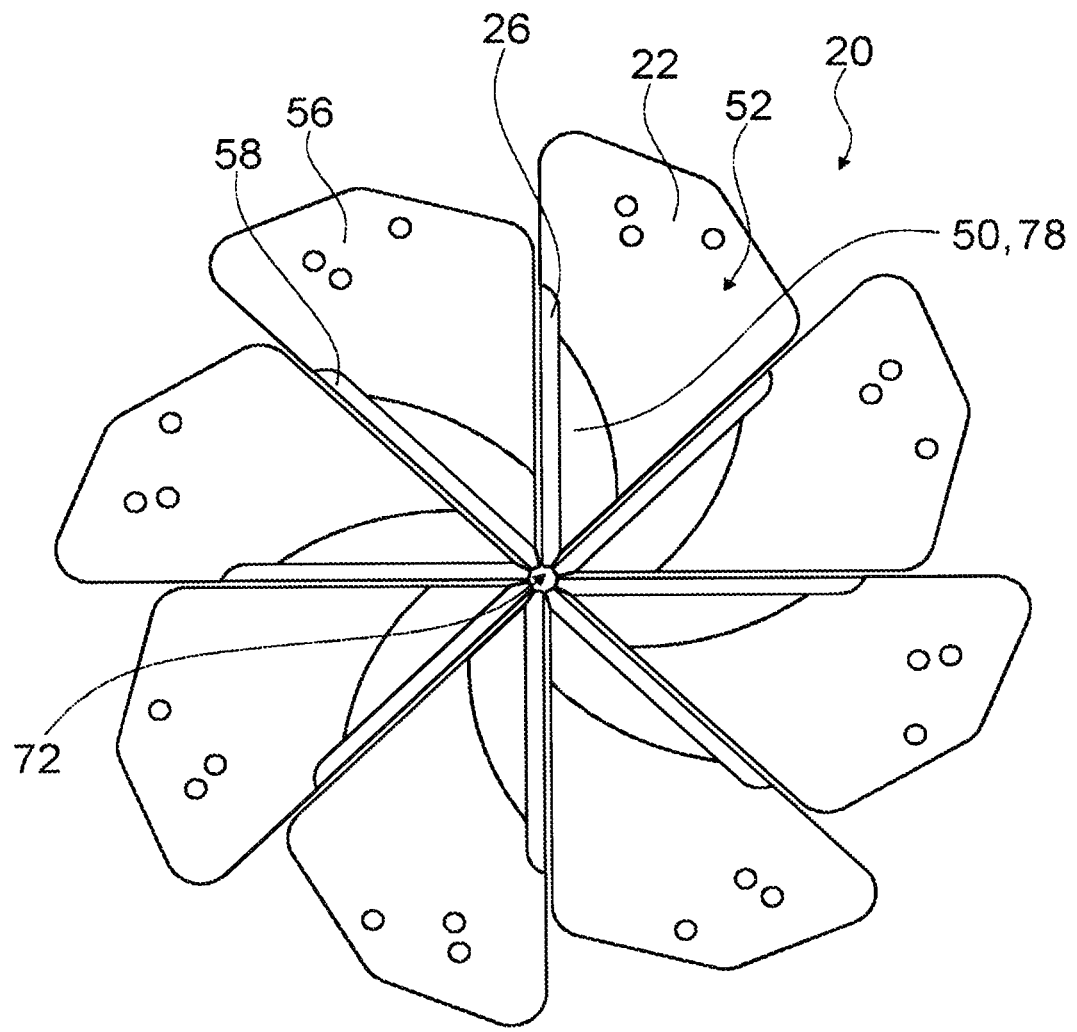

In FIG. 2 the magnetic flux conducting unit 20 is illustrated schematically. The magnetic flux conducting unit 20 comprises the magnetic flux conducting element 22. The magnetic flux conducting unit 20 comprises the further magnetic flux conducting elements 56. The further magnetic flux conducting elements 56 are arranged in the magnetic flux conducing unit 20 neighboring the magnetic flux conducting element 22. The magnetic flux conducting unit 20 illustrated in FIG. 2 comprises eight magnetic flux conducting elements 22, 56 in total. However, numbers of magnetic flux conducting elements 22, 56 differing from the number eight are also conceivable. The magnetic flux conducting elements 22, 56 are supported in the induction heating unit 16 so as to be movable relative to one another. The magnetic flux conducting elements 22, 56 are supported so as to be movable relative to the receiving region 18.

The magnetic flux conducting elements 22, 56 are implemented of a ferrimagnetic oxide ceramic. The magnetic flux conducting elements 22, 56 are implemented of a ferrite material. The magnetic flux conducting elements 22, 56 realize shielding elements of the shielding unit. The magnetic flux conducting elements 22, 56 realize field former elements of the field forming unit. Each magnetic flux conducting element 22, 56 of the magnetic flux conducting unit 20 in each case realizes a single shielding element. The magnetic flux conducting unit 20 has an inner opening 72. The inner opening 72 of the magnetic flux conducting unit 20 is adjustable in size, in particular in its diameter. The inner opening 72 of the magnetic flux conducting unit 20 is continuously adjustable in size, in particular in its diameter. The magnetic flux conducting elements 22, 56 are configured to form the inner opening 72 that is adjustable in size. The magnetic flux conducting elements 22, 56 are configured to define the size of the inner opening 72 by relative movements with respect to each other. The size and/or a shape of the opening 72 of the magnetic flux conducting unit 20 and/or a size and/or a shape of the opening 116 of the receiving region 18 are/is variable by means of the magnetic flux conducting elements 22, 56. The magnetic flux conducting elements 22, 56 are configured to encompass a tool 10 that is arranged at least partly in the receiving region 18 of the induction heating unit 16, or a tool holder 12 that is arranged at least partly in the receiving region 18 of the induction heating unit 16, in its circumference in such a way that the encompassment is at least substantially gap-free, in particular independently from an extent of the circumference of the encompassed tool 10 or of the encompassed tool holder 12. Each magnetic flux conducting element 22, 56 is free of an overlap with any further magnetic flux conducting elements 22, 56 of the magnetic flux conducting unit 20, in particular at least when viewed in the direction of the coil axis 118. Neighboring magnetic flux conducting elements 22, 56 of the magnetic flux conducting unit 20 closely adjoin each other in all possible adjustable arrangements. The magnetic flux conducting elements 22, 56 are aligned planarly and/or flush with each other. The tool holder 12 has on its upper end a runout 74 (cf. FIG. 1). The runout 74 is arranged around a tool receiving opening of the tool holder 12. In a shielding state, the magnetic flux conducting elements 22, 56 may (contact and) lie planarly upon the runout 74. In a shielding state, the magnetic flux conducting elements 22, 56 may (contact and) adjoin the tool shaft 112.

The magnetic flux conducting elements 22, 56 lie in a shared plane, in particular in a shared movement plane. Each magnetic flux conducting element 22, 56 comprises shielding surfaces 76. The shielding surfaces 76 form upper sides 54 or undersides 52 of the magnetic flux conducting elements 22, 56. The shielding surfaces 76 of the magnetic flux conducting elements 22, 56 extend perpendicularly to the coil axis 118. The shielding surfaces 76 of the magnetic flux conducting elements 22, 56 extend parallel to a radial direction of the receiving region 18.

Each magnetic flux conducting element 22, 56 has a shape of an acute-angled isosceles triangle, in which a corner situated opposite a tip 30 of the isosceles triangle has been cut off in a straight line. Alternatively it is conceivable that at least one magnetic flux conducting element 22, 56 or several magnetic flux conducting elements 22, 56 has/have a shape that differs from the shape of another magnetic flux conducting element 22, 56. The magnetic flux conducting elements 22, 56 have (on an underside 52) a bulge 78. The bulge 78 is in each case arranged on an end region of the magnetic flux conducting elements 22, 56 that faces toward the opening 72, in particular at the tip 30 of the magnetic flux conducting elements 22, 56. Advantageously, a lying-upon situation or an adjoining situation of the magnetic flux conducting elements 22, 56 on the tool holder 12 or on the tool 10 can be optimized by the bulges 78. It is advantageously possible to optimize a conduction of the induction magnetic field from the magnetic flux conducting unit 20 to the tool holder 12 or vice versa by means of the bulges 78. Of course, alternative shapes and implementations of the bulge 78 as well as dispensing with the bulge 78 are also conceivable.

The induction heating device 68 comprises a sleeve element 26, 58. The sleeve element 26, 58 is arranged on the respectively allocated magnetic flux conducting element 22, 56. Each of the magnetic flux conducting elements 22, 56 of the magnetic flux conducting unit 20 is respectively provided with a separate sleeve element 26, 58. FIG. 3 shows a schematic exploded illustration of a magnetic flux conducting element 22 that is provided with the sleeve element 26. In FIG. 4 the sleeve element 26 is arranged on the magnetic flux conducting element 22. The sleeve element 26 has been put over the magnetic flux conducting element 22. The induction heating device 68 comprises a pin element 60. The pin element 60 is configured to connect the sleeve element 26 and the magnetic flux conducting element 22 to each other. The sleeve element 26 has a hole 86. The magnetic flux conducting element 22 has a hole 90. The pin element 60 is completely guided/plugged through the hole 86 of the sleeve element 26. The pin element 60 is completely guided/plugged through the hole 90 of the magnetic flux conducting element 22. The pin element 60 connecting the sleeve element 26 and the magnetic flux conducting element 22 protrudes beyond the sleeve element 26 on an upper side 62 of the sleeve element 26. Alternatively or additionally, the pin element 60 could also protrude beyond the magnetic flux conducting element 22 on the underside 52 of the magnetic flux conducting element 22. The induction heating device 68 comprises a ball bearing 64. The pin element 60 is connected to the ball bearing 64, in particular to an inner ring of the ball bearing 64. The ball bearing 64, in particular an outer ring of the ball bearing 64, extends around the pin element 60. In the alternative or additional case of the pin element 60 protruding beyond the underside 52 of the magnetic flux conducting element 22, the pin element 60 may be connected on its underside 52 to a further ball bearing 66, which also extends around the pin element 60. In the case illustrated by way of example, the magnetic flux conducting element 22 and the sleeve element 26 respectively have two more holes which further pin elements 92, 94 have been guided/plugged through, wherein two of the pin elements 60, 92 have a ball bearing 64, which is arranged on the upper side 62 of the sleeve element 26, and one pin element 94 has a further ball bearing 66 which is arranged on the underside 52 of the magnetic flux conducting element 22. In this way particularly favorable and/or easy-running support of the magnetic flux conducting elements 22, 56, which are movable relative to one another, is advantageously achievable.

The sleeve element 26 covers the magnetic flux conducting element 22 on at least one side 24 of the magnetic flux conducting element 22 that faces toward the receiving region 18 at least in an operating state of the magnetic flux conducting unit 20. The sleeve element 26 is implemented at least to a large extent of a metallic material. The sleeve element 26 is implemented of a stainless steel. A first subregion 28 of the sleeve element 26 covers at least the tip 30 of the magnetic flux conducting element 22, which faces toward the receiving region 18 at least in an operating state of the magnetic flux conducting unit 20. The sleeve element 26 forms a receiving tub 82 with an all-around rim for receiving the magnetic flux conducting element 22 (cf. also FIG. 6). A shape of an inner side 80 of the receiving tub 82 is adapted to an outer shape 84 of the magnetic flux conducting element 22 (cf. also FIG. 8 or 9). The magnetic flux conducting element 22 is on an underside at least substantially free of a covering by the sleeve element 26 (cf. also FIG. 4). The magnetic flux conducting element 22 is on an upper side 54 almost completely covered by the sleeve element 26. The magnetic flux conducting element 22 has on at least one side edge a thickened region 50. The thickened region 50 is formed by the bulge 78 of the magnetic flux conducting element 22. The sleeve element 26 covers the thickened region 50 completely toward the side 24 (cf. also FIG. 5).

The magnetic flux conducting element 22 comprises a contact portion 126. The contact portion 126 of the magnetic flux conducting element 22 is configured for establishing a preferably tolerance-free contact with the sleeve element 26. The contact portion 126 forms a contact collar 124 (cf. FIG. 3). In the state when a sleeve element 26 is arranged on the magnetic flux conducting element 22, the contact collar 124 is surrounded by the sleeve element 26 completely in the circumferential direction. The contact collar 124 is arranged above the shielding surface 76 of the magnetic flux conducting element 22. The contact collar 124 is arranged on the upper side 54 of the magnetic flux conducting element 22. The contact collar 124 is arranged on a side of the magnetic flux conducting element 22 that faces toward the sleeve element 26, in particular on an inner side 80 of the sleeve element 26. The magnetic flux conducting element 22 comprises a shielding portion 128. The shielding portion 128 and the contact portion 126 are implemented integrally with each other, in particular in a monolithic fashion. The shielding portion 128 and the contact portion 126 have approximately the same thickness. In a regular operation, the shielding portion 128 faces toward the receiving region 18. Viewed in a top view onto the upper side 54 of the magnetic flux conducting element 22, the shielding portion 128 protrudes sidewise beyond the contact portion 126. Viewed from the underside 52 of the magnetic flux conducting element 22, the shielding portion 128 covers the sleeve element 26 almost completely. Only on the sides 24 facing toward the receiving region 18, the sleeve element 26 covers a side 24 of the magnetic flux conducting element 22 completely. A major portion, in particular a large portion, of the shielding portion 128, preferably the entire shielding portion 128, with the exception of the sides 24 facing toward the receiving region 18 at least in an operating state, is free of a covering by the sleeve element 26 in the circumferential direction.

The contact collar 124 forms a ledge. The ledge is implemented so as to extend partially around the magnetic flux conducting element 22. The ledge is interrupted only on the side 24 of the magnetic flux conducting element 22 that faces toward the receiving region 18 at least in an operating state. In the mounted state, the sleeve element 26 sits on the ledge formed by the contact collar 124. While the contact portion 126 is free of sharp edges in the circumferential direction, the shielding portion 128 has a tapering edge at the tip 30 of the magnetic flux conducting element 22. As a result, particularly favorable magnetic flux conduction is advantageously achievable while there is little wear in contact areas in which the magnetic flux conducting element 22 contacts the sleeve element 26.

Figure 7:
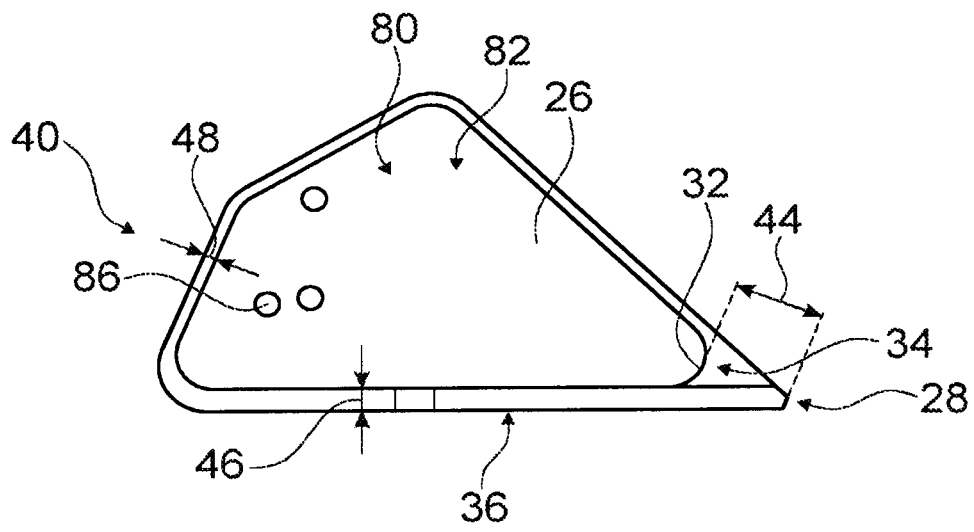

FIG. 7 shows a schematic view of the sleeve element 26 from below. The first subregion 28 of the sleeve element 26 has a rounded edge 34 on an inner contact side 32 that faces toward the tip 30 of the corresponding magnetic flux conducting element 22. The rounded edge 34 contacts only the contact portion 126 of the magnetic flux conducting element 22. Below the rounded edge 34, the tapering portion of the shielding portion 128 of the magnetic flux conducting element 22 protrudes beyond the rounded edge 34, in particular the side wall of the sleeve element 26 that forms the rounded edge 34. Side surfaces of the shielding portion 128 of the magnetic flux conducting element 22 are—in particular except for the side 24 of the magnetic flux conducting element 22 that faces toward the receiving region 18 at least in an operating state—approximately flush with side surfaces of the side walls of the sleeve element 26 (cf. FIG. 5).

The sleeve element 26 comprises a second subregion 36. The second subregion 36 of the sleeve element 26 covers a side surface 38 of the magnetic flux conducting element 22 which faces toward the receiving region 18 in at least one operating state of the magnetic flux conducting unit 20. The sleeve element 26 comprises a third subregion 40. The third subregion 40 covers at least one further side surface 42 of the magnetic flux conducting element 22, which differs from the side surface 38 of the magnetic flux conducting element 22 that is covered by the second subregion 36 of the sleeve element 26. The side surface 38 covered by the second subregion 36 is oriented differently than the further side surface 42 covered by the third subregion 40. The side surface 42 covered by the third subregion 40 faces away from the receiving region 18 in all operating states of the magnetic flux conducting unit 20. The third subregion 40 of the sleeve element 26 adjoins and contacts, at least during an operating state of the magnetic flux conducting unit 20, the further sleeve element 58 that covers the further magnetic flux conducting element 56 of the magnetic flux conducting unit. The third subregion 40 of the sleeve element 26 glides, at least during an operating state of the magnetic flux conducting unit 20, on the further sleeve element 58 that covers the further magnetic flux conducting element 56 of the magnetic flux conducting unit 20.

The first subregion 28 of the sleeve element 26 has a wall thickness 44. The second subregion 36 of the sleeve element 26 has a wall thickness 46. The third subregion 40 of the sleeve element 26 has a wall thickness 48. The wall thickness 44 of the first subregion 28 of the sleeve element 26 is substantially greater than the wall thickness 48 of the third subregion 40 of the sleeve element 26. The wall thickness 46 of the second subregion 36 of the sleeve element 26 is substantially greater than the wall thickness 48 of the third subregion 40 of the sleeve element 26. The wall thickness 44 of the first subregion 28 of the sleeve element 26 is substantially greater than the wall thickness 46 of the second subregion 36 of the sleeve element 26.

Figure 10:
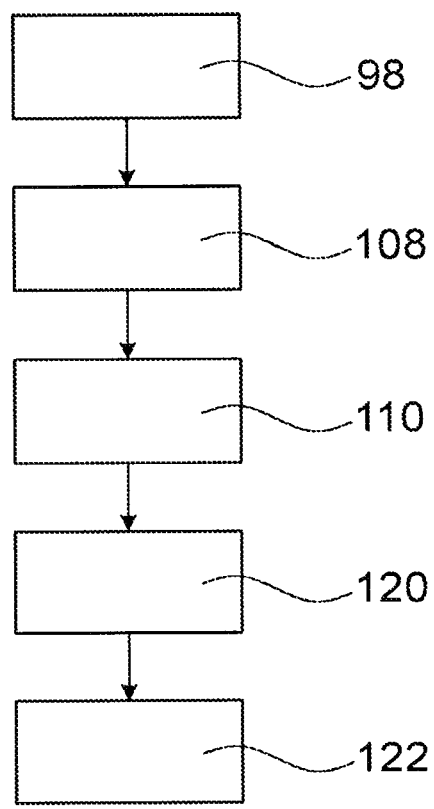

FIG. 10 shows a schematic flow chart of a method for a wear protection of the magnetic flux conducting element 22 by means of the sleeve element 26. In at least one method step 98 the magnetic flux conducting element 22 is manufactured from the ferrite material and is given the outer shape 84 shown, for example, in FIGS. 8 and 9. In at least one further method step 108 the sleeve element 26 is manufactured, e.g. bent, deep-drawn or milled, from the metallic material. In the method step 108 the sleeve element 26 is provided with a shape of the receiving tub 82 that is adapted to the outer shape 84 of the magnetic flux conducting element 22. In at least one further method step 110 the sleeve element 26 is put over the magnetic flux conducting element 22. In the method step 110 the sleeve element 26 is arranged on the magnetic flux conducting element 22. In the method step 110 the sleeve element 26 is fastened to the magnetic flux conducting element 22 by means of the pin elements 60, 92, 94. In at least one further method step 120 the magnetic flux conducting element 22, which is provided with the sleeve element 26, is combined with further magnetic flux conducting elements 56, which also have sleeve elements 58, to form the magnetic flux conducting unit 20. In at least one further method step 122, in an adjustment of the magnetic flux conducting elements 22, 56 relative to each other, the magnetic flux conducting element 22 is protected from a friction with neighboring magnetic flux conducting elements 56 by the sleeve element 26. In the method step 122, in an adjustment of the magnetic flux conducting elements 22, 56 toward a tool 10 that is arranged in the receiving region 18 and/or toward a tool holder 12 that is arranged in the receiving region 18, the magnetic flux conducting element 22 is protected from an abutment and/or impact on the tool 10 (e.g. on the tool shaft 112 of the tool 10) and/or on the tool holder 12 (e.g. on the runout 74 of the tool holder 12) by the sleeve element 26.

REFERENCE NUMERALS 10 tool
12 tool holder
14 induction coil
16 induction heating unit
18 receiving region
20 magnetic flux conducting unit
22 magnetic flux conducting element
24 side
226 sleeve element
28 first subregion
30 tip
32 inner contact side
34 rounded edge
36 second subregion
38 side surface
40 third subregion
42 further side surface
44 wall thickness
46 wall thickness
48 wall thickness
50 thickened region
52 underside
54 upper side
56 magnetic flux conducting element
58 sleeve element
60 pin element
62 upper side
64 ball bearing
66 ball bearing
68 induction heating device
70 base frame
72 opening
74 runout
76 shielding surface
78 bulge
80 inner side
82 receiving tub
84 outer shape
86 hole
88 shrink-clamping and/or unshrink-unclamping station
90 hole
92 pin element
94 pin element
96 adjusting unit
98 method step
100 holding device
102 length adjustment pin
104 tower 106 bearing rail
108 method step
110 method step
112 tool shaft
114 control and/or regulation unit
116 opening
118 coil axis
120 method step
122 method step
124 contact collar
126 contact portion
128 shielding portion

The invention claimed is:

1. An induction heating device for a shrink-clamping and/or unshrink-unclamping of tools into and/or out of a tool holder, the induction heating device having:
   an induction heating unit which comprises at least one induction coil, the induction coil being configured, during a shrink-clamping and/or unshrink-unclamping process, to thermally expand at least a portion of the tool holder that is arranged in a receiving region of the induction heating unit;
   at least one magnetic flux conducting unit for a conduction of a magnetic flux generated by the induction coil, the magnetic flux conducting unit comprising at least one magnetic flux conducting element; and
   a sleeve element, which is arranged on the magnetic flux conducting element and which covers the magnetic flux conducting element on at least one side of the magnetic flux conducting element that faces toward the receiving region in at least one operating state of the magnetic flux conducting unit.

2. The induction heating device according to claim 1, wherein the sleeve element is implemented at least to a large extent of a metallic material.

3. The induction heating device according to claim 1, wherein a first subregion of the sleeve element covers at least a tip of the magnetic flux conducting element that faces toward the receiving region at least in an operating state of the magnetic flux conducting unit.

4. The induction heating device according to claim 3, wherein the first subregion has a rounded edge on an inner contact side that faces toward the tip of the corresponding magnetic flux conducting element.

5. The induction heating device according to claim 3, wherein a second subregion of the sleeve element covers at least one side surface of the magnetic flux conducting element which, at least in an operating state of the magnetic flux conducting unit, faces toward the receiving region.

6. The induction heating device according to claim 5, wherein a third subregion of the sleeve element covers at least one further side surface of the magnetic flux conducting element at least partially.

7. The induction heating device according to claim 6, wherein a wall thickness of the first subregion of the sleeve element and/or a wall thickness of the second subregion of the sleeve element are/is greater than a wall thickness of the third subregion of the sleeve element.

8. The induction heating device according to claim 1, wherein the magnetic flux conducting element comprises a thickened region on at least one side edge, and wherein the sleeve element covers the thickened region.

9. The induction heating device according to claim 1, wherein the magnetic flux conducting element is on an underside free of a covering by the sleeve element.

10. The induction heating device according to claim 1, wherein the magnetic flux conducting element is on an upper side covered by the sleeve element at least to a large extent.

11. The induction heating device according to claim 1, wherein the sleeve element forms a receiving tub with an all-around rim for receiving the magnetic flux conducting element.

12. The induction heating device according to claim 11, wherein a shape of an inner side of the receiving tub is adapted to an outer shape of the magnetic flux conducting element.

13. The induction heating device according to claim 1, wherein the magnetic flux conducting unit comprises a plurality of magnetic flux conducting elements, which are respectively provided with separate sleeve elements.

14. The induction heating device according to claim 13, wherein a wall thickness of the first subregion of the sleeve element and/or a wall thickness of the second subregion of the sleeve element are/is greater than a wall thickness of the third subregion of the sleeve element, and
wherein at least during an operating state of the magnetic flux conducting unit, the third subregion of the sleeve element contacts and adjoins a further sleeve element, which covers a further magnetic flux conducting element of the magnetic flux conducting unit.

15. The induction heating device according to claim 1, comprising
   a pin element, which is configured to connect the sleeve element and the magnetic flux conducting element to each other.

16. The induction heating device according to claim 15, wherein the pin element connecting the sleeve element and the magnetic flux conducting element protrudes beyond the sleeve element at least on an upper side of the sleeve element and is connected with a ball bearing that extends around the pin element, and/or
wherein the pin element connecting the sleeve element and the magnetic flux conducting element protrudes beyond the magnetic flux conducting element on an underside of the magnetic flux conducting element and is connected with a further ball bearing that extends around the pin element.

17. A method for a wear protection of a magnetic flux conducting element by means of a sleeve element for an induction heating device according to claim 1, comprising:
   at least one method step of putting the sleeve element over the at least one magnetic flux conducting element and fastening the sleeve element to the at least one magnetic flux conducting element, and
   at least one further method step of, in an adjustment of the at least one magnetic flux conducting element relative to other magnetic flux conducting elements of the induction heating device, the sleeve element protecting the at least one magnetic flux conducting element from a friction with neighboring magnetic flux conducting elements.

18. The induction heating device of claim 1,
wherein the at least one magnetic flux conducting element is supported movably relative to the receiving region and is implemented at least to a large extent of a ferrite material.

19. The induction heating device according to claim 2,
wherein the sleeve element is implemented at least to a large extent of a stainless steel.

20. The induction heating device of claim 1, wherein a size and/or a shape of an opening of the receiving region and/or of an opening of the magnetic flux conducting unit are/is variable by means of the at least one magnetic flux conducting unit.

* * * * *